United States Patent [19]

Alsberg et al.

[11] 4,115,478

[45] Sep. 19, 1978

[54] HIGH IMPACT POLYMER AND PROCESS FOR ITS PRODUCTION

[75] Inventors: Henry Alsberg, Northbrook; Dale W. Skalla, Oak Park; Michael R. Tirpak, Maywood, all of Ill.

[73] Assignee: Richardson Corporation, Des Plaines, Ill.

[21] Appl. No.: 721,742

[22] Filed: Sep. 17, 1976

Related U.S. Application Data

[63] Continuation of Ser. No. 520,838, Nov. 4, 1974, abandoned, which is a continuation of Ser. No. 335,347, Feb. 23, 1973, abandoned.

[51] Int. Cl.$^2$ ........................................... C08F 279/06
[52] U.S. Cl. ............................................... 260/880 R
[58] Field of Search ........... 260/876 R, 876 B, 880 R, 260/880 B

[56] References Cited

U.S. PATENT DOCUMENTS

| | | | |
|---|---|---|---|
| 2,886,553 | 5/1959 | Stein | 260/880 R |
| 3,178,489 | 4/1965 | Lunk | 260/880 R |
| 3,261,887 | 7/1966 | Mann | 260/876 |
| 3,267,178 | 8/1966 | Lee | 260/880 R |
| 3,359,345 | 12/1967 | Doak | 260/880 R |
| 3,400,175 | 9/1968 | Finestone | 260/880 R |
| 3,536,784 | 10/1970 | Skendrovich | 260/880 R |
| 3,671,610 | 6/1972 | Amagi | 260/880 R |

*Primary Examiner*—Paul R. Michl
*Attorney, Agent, or Firm*—Alan M. Abrams

[57] ABSTRACT

A two step process for the production of high impact strength polymer compositions. The process includes reacting an acrylic and a vinyl aromatic with an elastomeric polymer, forming an intermediate reaction product containing acrylic and vinyl aromatic units grafted on to the elastomeric polymer backbone. Additional acrylic and vinyl aromatic are added and a final reaction product suitable for use in molding processes is produced. Preferably, both steps of the process are carried out in aqueous suspension. The product is made up of an insitu mixture of a graft polymer having elastomeric polymer backbone and a random polymer made up of units of vinyl aromatic and acrylic units.

9 Claims, No Drawings

HIGH IMPACT POLYMER AND PROCESS FOR ITS PRODUCTION

This is a continuation of application Ser. No. 520,838, filed Nov. 4, 1974 now abandoned which, in turn, was a continuation of application Ser. No. 335,347 filed Feb. 23, 1973 now abandoned.

BACKGROUND OF THE INVENTION

1. Field of the Art

The field of art to which this invention pertains is polymer production and compositions. More particularly, this invention relates to a two-step process, preferably performed in an aqueous suspension, to produce a polymer having high impact resistance and also preferably having a high degree of transparency. This invention also relates to a composition of graft and random polymer mixtures.

2. Description of the Prior Art

Relevant prior art can be found in the following U.S. and British patents.

U.S. Pat. No. 3,426,103 (Class 260-880) relates to a method of making transparent polymers by dissolving a rubbery elastomeric polymer in monomers such as tertiaryalkylstyrenes and alkylstyrenes and acrylonitrile and heating the solution to inter-polymerize the monomers and the rubbery elastomeric polymer. At Column 2, lines 40 through 45 of that patent, there is discussion relating to the polymerization of the monomers which is carried out, in one alternate embodiment, by dispersing the monomers and the elastomeric polymer as droplets in an inert aqueous medium, i.e., in suspension, with a reaction temperature between about 60° and 180° C. The aqueous suspension process utilized in this patent, however, is distinguished from the present invention by an important factor - namely, applications in the present case utilize a two-step process in which a pre-polymerization step occurs followed by an additional addition of monomers. Preferably, both steps of applicants' process take place in an aqueous suspension. The addition of the monomers in applicants' second step is not disclosed in the subject patent.

U.S. Pat. No. 3,579,612 (Class 260-880) discloses a process in which the bulk polymerization of styrene and a rubbery polymer occurs, followed by suspending the resultant prepolymer in an aqueous medium containing a protective colloid and an extender.

British Pat. No. 1,046,646 (International Classification CO8f25/00) describes a novel two step process for preparing inter-polymers which comprises dissolving a rubbery component in a mixture of styrene and methyl methacrylate, prepolymerizing the resultant mixture to obtain a certain degree of conversion, and thereafter suspending the intermediate pre-polymer in an aqueous medium containing a minor quantity of a suspension stabilizer for complete polymerization to form interpolymer beads which are subsequently recovered from the system.

British Pat. No. 1,105,187 (International Classification CO8f25/00) relates to a method of manufacturing butadienemethyl methacrylate-vinyl aromatic polymer compositions. In particular, methyl methacrylate is added and polymerized with the butadiene polymer. An aromatic vinyl compound is then added for additional polymerization; the entire process being carried out in an aqueous dispersion in which the diameter of substantially all of the particles in the dispersion of the butadiene polymer remains less than one-tenth of a micron which contributes to the excellent transparency of the resulting molded product.

None of the above four patents in any manner disclose or render obvious the process claimed by applicants. Specifically, applicants' process utilizes a two-step polymerization process which is preferably carried out in an aqueous suspension. It is noteworthy that applicants' process, in the second step thereof, adds additional monomer to the suspended pre-polymer. The cited art does not teach or disclose this.

SUMMARY OF THE INVENTION

Our invention can be summarized as a two-step process for producing high impact polymers and such compositions. The process steps comprise reacting an acrylic and a vinyl aromatic with an elastomeric polymer of a conjugated diene hydrocarbon at primary polymerization conditions, forming a pre-polymer intermediate reaction product comprising the acrylic and vinyl aromatic units grafted onto the elastomeric polymer, and thereafter adding additional acrylic and vinyl aromatic material to the intermediate product to cause further polymerization and production of a high impact polymer product.

Our invention can additionally be summarized as a high impact polymer product comprising a blend of two polymers comprising polymer having acrylic and vinyl aromatic units grafted to an elastomeric backbone of block copolymer comprising conjugated diene and vinyl aromatic units, and random polymer comprising acrylic and vinyl aromatic units.

In one embodiment, our invention relates to a two-stage process for producing polymeric compositions with improved impact resistance which process comprises reacting an acrylic and a vinyl aromatic with an elastomeric polymer of a conjugated diene hydrocarbon in sufficient amounts and under conditions to form an intermediate pre-polymer reaction product comprising a major portion of a grafted elastomeric polymer, and reacting additional amounts of acrylic and vinyl aromatic monomers in the presence of the intermediate reaction product under conditions to form a final reaction product with improved impact compared to a product from a one-stage process.

In another embodiment, our invention relates to a polymeric composition with clarity equivalent to at leat 70% light transmission and with a notched Izod impact of at least 1.0 ft. lb./in., which composition comprises an insitu blend of a graft-polymer and random polymer, the graft-polymer being an elastomeric block copolymer of a conjugated diene hydrocarbon and a vinyl aromatic grafted with an acrylic and vinyl aromatic, the random polymer composed mainly of the acrylic and vinyl aromatic units.

DETAILED DESCRIPTION OF THE INVENTION

This invention is directed preferably to transparent solid compositions having high impact resistance and methods of production of those compositions. More particularly, this invention relates to clear polymeric compositions made up of mixtures of graft and random polymers and processes for making them. The process comprises two steps, and preferably takes place in an aqueous suspension.

Transparent and plastic compositions have been utilized for several years as containers for cosmetics, detergents, foods, and the like. More recently, emphasis has been placed on the production of containers with clarity such that the customer is able to see their contents prior to purchase. While clarity has been satisfactory in many of the present day containers, the other properties of the containers have not always been desirable for their intended purpose. With regard to the plastic polymers based on conjugated diene polymers such as butadiene-styrene copolymers and butadiene-styrene-methyl methacrylate terpolymers, the resistance of the containers to impact has been satisfactory but the clarity of such products has been poor.

The proposed invention provides both a process for the manufacture of and compositions which have high impact resistance and, even more preferably transmit light possessing exceptional clarity for molded products. In the process, preferably a two-stage reaction process occurs, and more preferably, in an aqueous suspension medium. Elastomeric polymers are first grafted with the acrylic and vinyl aromatic monomers, and then additional amounts of the monomers are reacted in the presence of the first product to form a final blend of polymers. When the monomers are reacted with the elastomeric polymers in a single-step process, the resulting composition in many cases has exceptional clarity but is very inferior with respect to impact resistance. The composition produced by the process, and also claimed herein as a composition, is a blend of a grafted elastomeric polymer and a copolymer of acrylic and vinyl aromatic monomers.

The invention process is carried out in two-steps and comprises reacting acrylic and vinyl aromatic monomers with an elastomeric polymer of a conjugated diene hydrocarbon (in sufficient amounts and under suitable reaction conditions) to form in the pre-polymer intermediate reaction product a major portion of grafted elastomeric polymer. The first reaction step takes place utilizing less than all of the two monomers required for the final composition of the product formed. By adding additional quantities of the two monomers (vinyl aromatics and acrylics) in the second-step, the concentration of the elastomeric polymer is in the first step higher, thereby presumably allowing a higher degree of grafting than would occur if all of the components were present in a single step. In the second reaction step, the two monomers are added to the resulting intermediate prepolymer product formed in the first step. The monomers permeate the partially converted pre-polymer intermediate product and themselves react forming an insitu mixture of graft and random polymers.

By forming a partially converted mass of polymers which is then intimately contacted with additional monomer reactants, it is possible to produce highly impact resistant products. When the refractive indices of the elastomer and random polymer match a clear final product can be produced when the polymer is molded.

The two-step process, however, is not limited to the production of high impact, high clarity polymers. In many instances, when the above two-step procedure takes place in an aqueous suspension, high impact resistant opaque polymers are produced. In most all instances, the above process will allow the production of a high impact polymer product. In the process, the elastomeric component is a conjugated diene and advantageously a copolymer of a diene and a vinyl aromatic monomer. Suitable dienes include butadiene, isoprene, and other dienes associated with elastomeric polymers. The vinyl aromatic can be styrene, methylstyrene, vinyltoluene, vinylnaphthalene, tertiary butylstyrene, and the like. Advantageously, the elastomeric polyer contains butadiene and styrene and preferably is a block copolymer. Preferably, the block copolymer contains about 50 to 90 weight percent of units based on butadiene.

The acrylic or acrylate and vinyl aromatic monomers are reacted with the elastomeric polymer to form a graft copolymer in the first step and then further reacted with the pre-polymer product in the second step. Suitable acrylic monomers include ethyl acrylate, butyl acrylate, methyl acrylate, ethyl acrylate, t-butyl methacrylate, methyl methacrylate, and the like.

The vinyl aromatic and acrylic monomers used as reactants in the first and second steps of the claimed process can be relatively pure components of each class of monomers or can be mixed with other monomers of the same or other classes. In particular, the vinyl aromatic can comprise a mixture of styrene and one or more vinyl aromatics such as tertiary butyl styrene with or without inert carriers or solvents. In a similar manner, the acrylic monomer can be a single monomer or be mixed with other monomers of the same class, and with or without inert carriers or solvents.

A particularly preferred set of reactant monomer is styrene and methyl methacrylate and a butadiene-styrene block copolymer as the elastomeric component. Another set of desirable monomers includes styrene and tertiary butylstyrene as the vinyl aromatic component, and methyl methacrylate along with a butadiene-styrene block copolymer elastomeric component.

Preferably, the same composition of monomers as added in the first step of the process is used for the second step monomer addition, although in some instances the specific composition of the monomers added in the second-step may differ from that of the monomer addition in the first-step. It is specifically preferred that no elastomeric copolymer be added during the second-step monomer addition.

Advantageously, the process is carried out with the monomers providing about 70–95 weight percent of the total charge of the two-stage process and about ⅓ to ⅔ of this is added to the elastomer in the first step. Also, advantageously with methyl methacrylate and styrene these are employed in a respective weight ratio of from about 40:60–60:40. Preferably, with an elastomeric copolymer of butadiene and styrene, the weight percentage of butadiene is about 70 to 80% of the elastomer. The elastomer is about 10 to 25% of the total reactants and the total combined weight of the methyl methacrylate is about 30–60 weight percent of the total reactants.

Advantageously, the process is carried out in aqueous suspension and provides final product having reasonable particle size which can be dried and easily used in molding operations. The suspension process preferably takes place in water with the particle size of the beads produced being predominantly within the range of from about 40–60 mesh (about 840 down to 350 micron particle size). The particle size of the beads produced is preferably greater than about 200 microns to distinguish the claimed suspension process from dispersion processes used by the art.

As a suspending agent for both steps of the suspension polymerization where the final product is desired to be spherical beads, there can be used a water-soluble nonionic colloid such as hydroxyethyl cellulose or other similar type suspending agents known to the art. The quantities of the suspending agent, depending on the type used and the polymer being produced, can vary from about 0.1 to about 1.0 wt. percent based on the water. As peroxide initiators, the usual monomer soluble free radical initiators can be used in the amount usually about 0.1 to about 2.0 weight percent and preferably 0.1 to 1.0 weight percent of the organic components. Suitable peroxide catalysts are known in the art and advantageously initiate the reactions at about 150° to 190° F., or higher. A preferred catalyst is benzoyl peroxide. Although other catalyst known in the art can be utilized in our process.

The suspension may also include high temperature initiators such as t-butyl peracetate in an amount of from about 0.01 to about 0.5 weight percent and preferably from about 0.01 to about 0.1 weight percent based on the organic components. Chain regulators such as mercaptans, stabilizers such as di-tertiary butyl-p-cresol and trisnonylphenyl phosphite and lubricants such as mineral oil may also be incorporated in the process and the final reaction product thereof.

In the two-step reaction, the first step or primary polymerization conditions, is carried out at a temperature range of from about 160° to about 200° F., and preferably from 180° to 190° F. The second step or secondary polymerization conditions is usually carried out at a temperature of from about 180° to 270° F., and preferably at a temperature of from about 190° to 240° F. Agitation of the aqueous suspension during both steps of the process is preferred.

The final product from the two-step process is typically a bead product and can be washed, dried, and extruded into pellets. Advantageously, the product exhibits a clarity above about 70 percent light transmittance and preferably above about 75 to 80 percent with an Izod Impact, notched, of at least 1 to about 4 or 6 ft. lb./in.

EXAMPLE I

A clear polymeric composition was prepared from an elastomeric block copolymer of butadiene and styrene with a weight ratio of about 75:25, methyl methacrylate and styrene. In the process, about 62.5 g. of hydroxyethyl cellulose was dissolved in about 75 lb. of water in a 20 gallon reactor. The solution was heated to about 160° F., and then about 11.3 lb. of the elastomer, 24.8 lb. of methyl methacrylate and 19.2 lb. of styrene was added to the solution together with about 101.9 g. of benzoyl peroxide, 12.6 g. of t-butyl peracetate and 68.1 g. of t-dodecylmercaptan.

The solution was heated to about 185° F., and held at this temperature for about 2 hours. Then a co-monomer charge of about 10.4 lb. of methyl methacrylate and 8.4 lb. of styrene was added. The reaction medium of initial product and reactants was heated to about 195° F., held at this temperature for about 90 minutes, then heated to about 265° F., and held for about 1 hour.

The polymer beads were separated from water, washed, dried, and extruded into pellets. These were tested for clarity and Izod Impact. The results are in Table I together with results for a product from a one-stage process under similar conditions.

TABLE I

|  | Example I Composition | Comparison Composition |
|---|---|---|
| Clarity (% light transmission) | 70 | 70 |
| Notched Izod Impact (ft.lb./in.) | 3.5 | 0.6 |
| Reaction Conditions |  |  |
| Water lbs. | 75.0 | 75.0 |
| Hydroxyethyl Cellulose g. | 62.5 | 62.5 |
| Step I Reactants |  |  |

TABLE I-continued

|  | Example I Composition | Comparison Composition |
|---|---|---|
| Block copolymer lbs. | 11.3 | 11.3 |
| Methyl Methacrylate lbs. | 24.8 | 35.2 |
| Styrene lbs. | 19.2 | 27.6 |
| Benzoyl Peroxide g. | 101.9 | 101.9 |
| t-Butyl Peracetate g. | 12.6 | 12.6 |
| t-Dodecyl Mercaptan g. | 68.1 | 68.1 |
| Step II Reactants |  |  |
| Methyl Methacrylate lbs. | 10.4 | — |
| Styrene lbs. | 8.4 | — |
| Conditions |  |  |
| ° F. / hr. | 185/2.25 | 185/2.0 |
| ° F. / hr. | 195/1.5 | 195/1.5 |
| ° F. / hr. | 265/1.0 | 265/1.0 |

EXAMPLE II

This example is presented to show the improved impact strength and high heat resistance of a polymer prepared according to the claims of the process disclosed herein, as compared to polymers prepared by blending techniques.

In a first test, 60 parts by weight of a copolymer of styrene and t-butylstyrene (70/30 by wt.) were blended with 40 parts by weight of a commercial impact polystyene (Union Carbide TMD 5161). Molded specimens of the individual reactants and the product of the blend were tested for impact resistance and heat deflection.

In a second test, 65 parts be weight of a copolymer of styrene and t-butylstyrene (40/60 by wt.) were blended with 35 parts by weight of a commercial dry high impact polystyrene (Union Carbide TMD 2100). Molded specimens of the individual two starting materials and the product were tested for impact resistance and heat deflection.

In a third test, which illustrated the process of this invention, the following procedures were followed. To a 20 gallon reactor was added 62.5 g. of hydroxyethyl cellulose dissolved in 75 lbs. of deionized water. After heating to 160° F., a solution of 11.3 lbs. of 25/75 styrene-butadiene block copolymer, 23.3 lbs. of methyl methacrylate, 5.2 lbs. of styrene, and 15.5 lbs. of t-butylstyrene was added. This solution also contained 0.15 lbs. of benzoyl peroxide, 0.03 lbs. of t-butyl peracetate and 0.15 of t-dodecyl mercaptan. The temperature was raised to 185° F., and held there for 2 hours. The second-step of our process was then performed. A mixture of 10.0 lbs. of methyl methacrylate, 2.2 lbs. of styrene, and 6.7 lbs. of t-butylstyrene was added. The mixture was heated to 195° F., and held for 2½ hours at that temperature. Then the mixture was heated to 265° F., and held there for 1 hour.

The polymer heads formed were dewatered, washed, dried, and extruded with 0.2 wt.% di-t-butyl-p-creasol into pellets suitable for molding. The molded specimens were tested for impact resistance and heat deflection temperatures.

The results of the above 3 tests are shown in Table II.

TABLE II

| Material | Notched Izod Ft. Lb./Inch | Annealed Heat Deflection Temp., ° F. |
|---|---|---|
| First Test |  |  |
| 70/30 Copolymer | 0.26 | 229 |
| TMD 5161 | 3.00 | 190 |
| 60/40 Blend (Product) | 0.56 | 212 |
| Second Test |  |  |
| 40/60 Copolymer | 0.17 | 254 |
| TMD 2100 | 6.00 | 180 |

TABLE II-continued

| Material | Notched Izod Ft. Lb./Inch | Annealed Heat Deflection Temp., °F. |
|---|---|---|
| 65/35 Blend (Product) Third Test | 0.61 | 227 |
| Product | 2.00 | 226 |

The above examples were presented as specific illustrative embodiments of our invention, and as such, should not be read to unduly limit the scope of the claims.

We claim:

1. A suspension polymerization process for producing transparent, high impact resistant copolymers which comprises:
   (A) a first suspension polymerization step, at primary polymerization conditions in the presence of a suspending agent dissolved in water, said first step reacting an aqueous suspension of a block styrene-butadiene elastomeric copolymer, an acrylic monomer material, and styrene, said monomer material having the following formula:

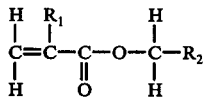

wherein $R_1$ is hydrogen or an alkyl group having from 1 to 3 carbon atoms, and $R_2$ is hydrogen or an alkyl group having 1 to 15 carbon atoms, to form an intermediate bead prepolymer, said intermediate bead prepolymer containing said acrylic monomer and said styrene grafted onto the backbone of the elastomeric polymer; and
   (B) a second suspension polymerization step, at secondary polymerization conditions without adding further suspending agent, said second step reacting additional quantities of reactants consisting essentially of styrene and said acrylic monomer with said intermediate bead prepolymer while same is still suspended in the aqueous medium, the additional styrene and acrylic monomer thereby permeating said intermediate bead prepolymer for in situ reaction formulation of a final beaded polymer product blend of styrene and said acrylic monomer grafted onto said elastomeric polymer and a random copolymer of styrene and said acrylic monomer; said acrylic monomer and styrene together making up about 70 to 95 percent of the total charge of reactants in the entire process, about ⅓ to about ⅔ by weight of the total quantity of said acrylic monomer and styrene used in the entire process being added in said first polymerization reaction step with the remaining quantities of acrylic monomer and styrene being added in said second polymerization reaction step.

2. The process of claim 1 wherein the elastomeric block copolymer of butadiene and styrene contains about 50 to about 90 percent by weight units based on butadiene.

3. The process of claim 1 wherein methyl methacrylate is said monomer material.

4. The process of claim 3 further characterized in that the methyl methacrylate and styrene monomers are present in a weight ratio of from about 40:60 to 60:40.

5. The process of claim 4 further characterized in that the elastomeric polymer contains about 50 to 90 weight percent of units based on butadiene.

6. The process of claim 1 further characterized in that the elastomeric polymer is about 10 to 25 weight percent of the total reactants and the monomer material is about 30 to 60 weight percent of the total reactants.

7. The process of claim 1, further characterized by forming said final beaded polymer product blend to a particle size between about 200 to 840 microns.

8. An aqueous two-step suspension process for producing transparent, high-impact copolymers, comprising a two-step process, each step being a suspension polymerization, wherein:
   (A) said first suspension polymerization step reacts an aqueous suspension of methyl methacrylate and styrene monomers with an elastomeric block polymer of styrene and butadiene at primary suspension polymerization conditions at a temperature within the range of from about 160° to 200° F. to form an intermediate bead prepolymer containing said methyl methacrylate and styrene monomers grafted onto the elastomeric polymer; and
   (B) said second suspension polymerization step adds to said intermediate bead prepolymer while same is suspended in the aqueous medium additional reactants consisting essentially of methyl methacrylate and styrene monomers in the presence of the intermediate prepolymer at secondary suspension polymerization conditions to form a final reaction product of beads of methyl methacrylate and styrene grafted onto the elastomeric polymer and random polymer units of styrene and methyl methacrylate, said secondary polymerization conditions carried out in an aqueous suspension at temperatures within the range of from about 180° to 275° F. and without the addition of further suspending agent so that the additional monomers permeate such intermediate bead prepolymer for further in situ reaction therewith; and said methyl methacrylate and styrene monomers together make up about 70 to 95 percent of the total charge of reactants in the entire process, about ⅓ to about ⅔ by weight of the total quantity of styrene and methyl methacrylate monomer being added in said first suspension polymerization step with the remaining methyl methacrylate and styrene added in said second suspension polymerization step.

9. The process of claim 8 further characterized in that the elastomeric block polymer is about 10 to 25 weight percent of the total reactants and the methyl methacrylate is about 30 to 60 weight percent of the total reactants.

UNITED STATES PATENT AND TRADEMARK OFFICE
CERTIFICATE OF CORRECTION

PATENT NO. : 4,115,478
DATED : September 19, 1978
INVENTOR(S) : Alsberg et al.

It is certified that error appears in the above-identified patent and that said Letters Patent are hereby corrected as shown below:

Column 1, line 25, delete "and alkylstyrenes"

Column 2, line 26, "leat" should read --least--

Column 4, line 2, "polyer" should read --polymer--

Column 6, line 28, "be" should read --by--

Column 6, line 52, "heads" should read --beads--

Signed and Sealed this

Fifth Day of June 1979

[SEAL]

Attest:

RUTH C. MASON
Attesting Officer

DONALD W. BANNER
Commissioner of Patents and Trademarks